United States Patent [19]
van der Lely

[11] 4,111,266
[45] Sep. 5, 1978

[54] AGRICULTURAL IMPLEMENTS

[76] Inventor: Cornelis van der Lely, 7 Brüschnerain, Zug, Switzerland

[21] Appl. No.: 721,566

[22] Filed: Sep. 8, 1976

[30] Foreign Application Priority Data

Sep. 8, 1975 [NL] Netherlands .................... 7510538

[51] Int. Cl.² ...................... A01B 33/06; A01B 33/08
[52] U.S. Cl. ...................................... 172/59; 172/125; 74/359
[58] Field of Search .................. 171/142; 172/125, 59, 172/111; 74/336, 360 R, 359

[56] References Cited

U.S. PATENT DOCUMENTS

| 1,985,015 | 12/1934 | Bush | 74/360 |
| 2,185,636 | 1/1940 | Kysor | 74/360 R |
| 3,667,551 | 6/1972 | Lely et al. | 172/125 |
| 3,774,689 | 11/1973 | Lely et al. | 172/112 |
| 3,783,948 | 1/1974 | Lely et al. | 172/59 |
| 3,889,547 | 6/1975 | Sun | 74/336 |

Primary Examiner—Richard J. Johnson
Attorney, Agent, or Firm—Mason, Mason & Albright

[57] ABSTRACT

An implement, such as a cultivator with rotary tools, has a drive from an imput shaft to an output shaft via a change speed gear assembly. A driving shaft is connected to the imput and the driving shaft rotates a side shaft, which can be the output shaft. A corresponding set of different sized gear wheels are mounted on both the driving shaft and the side shaft. The gear wheels of one set are meshed with respective gear wheels of the other set and drive is transmitted through any one pair of meshed gear wheels. Either one of the driving or side shafts can be displaced with respect to the corresponding gear wheel set and external splines on that one shaft selectively engage the internal splines of any one of the gear wheels to selectively establish a gear transmission ratio that rotates the tools at predetermined speeds.

20 Claims, 7 Drawing Figures

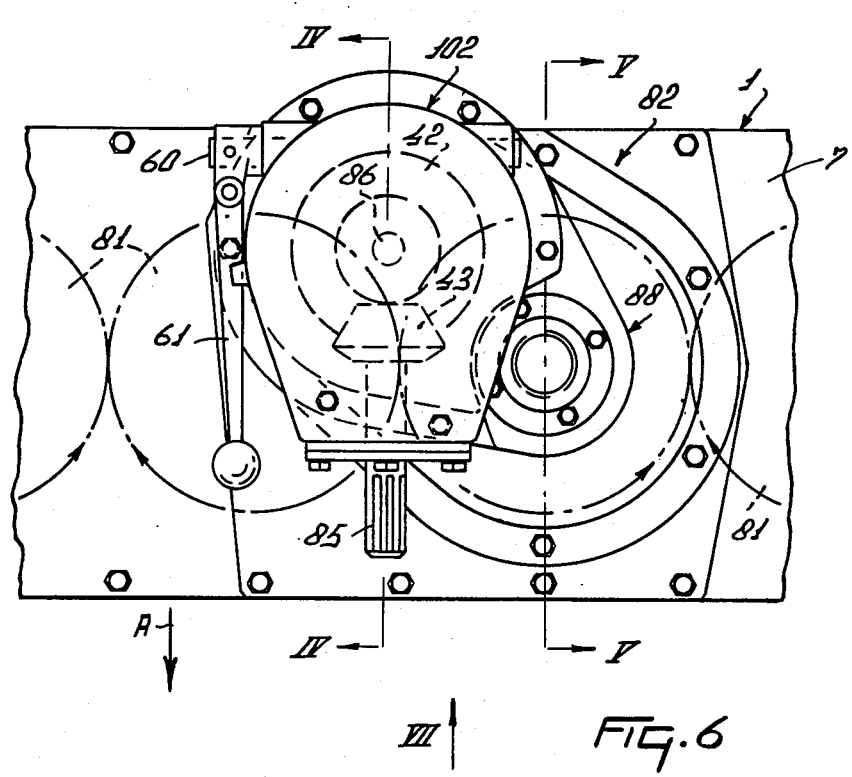
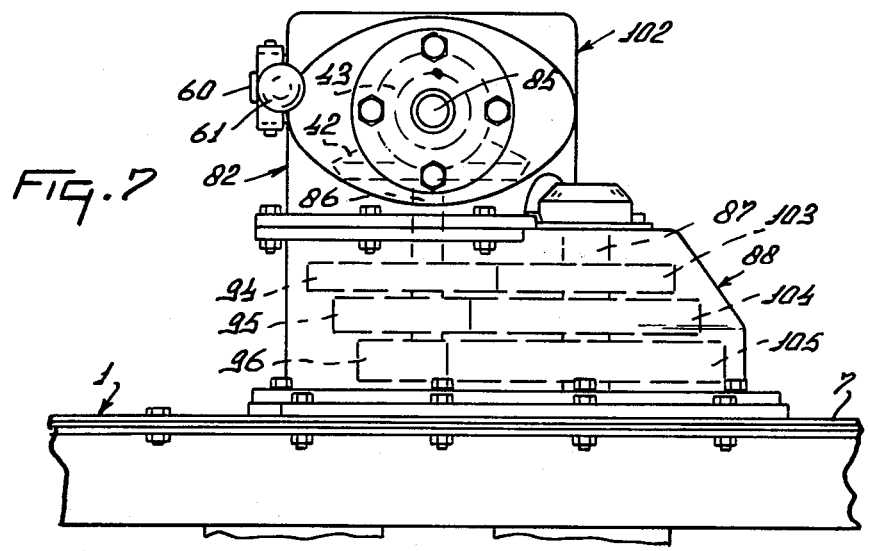

AGRICULTURAL IMPLEMENTS

In order to permit of bringing the driving speed of the working member(s) to a value suitable for different operative conditions, such as the kind of soil, the nature of the crop, the working rate or the substances to be spread, this driving speed should be variable in a simple manner without loss of time and, for example, without the need for replacing gear wheels.

According to one aspect of the invention, there is provided an agricultural implement of the kind set forth, wherein a shaft is displaceable in at least one gear wheel in order to be able to select a chosen one of at least two transmissions ratios to said working member.

Figure 1:
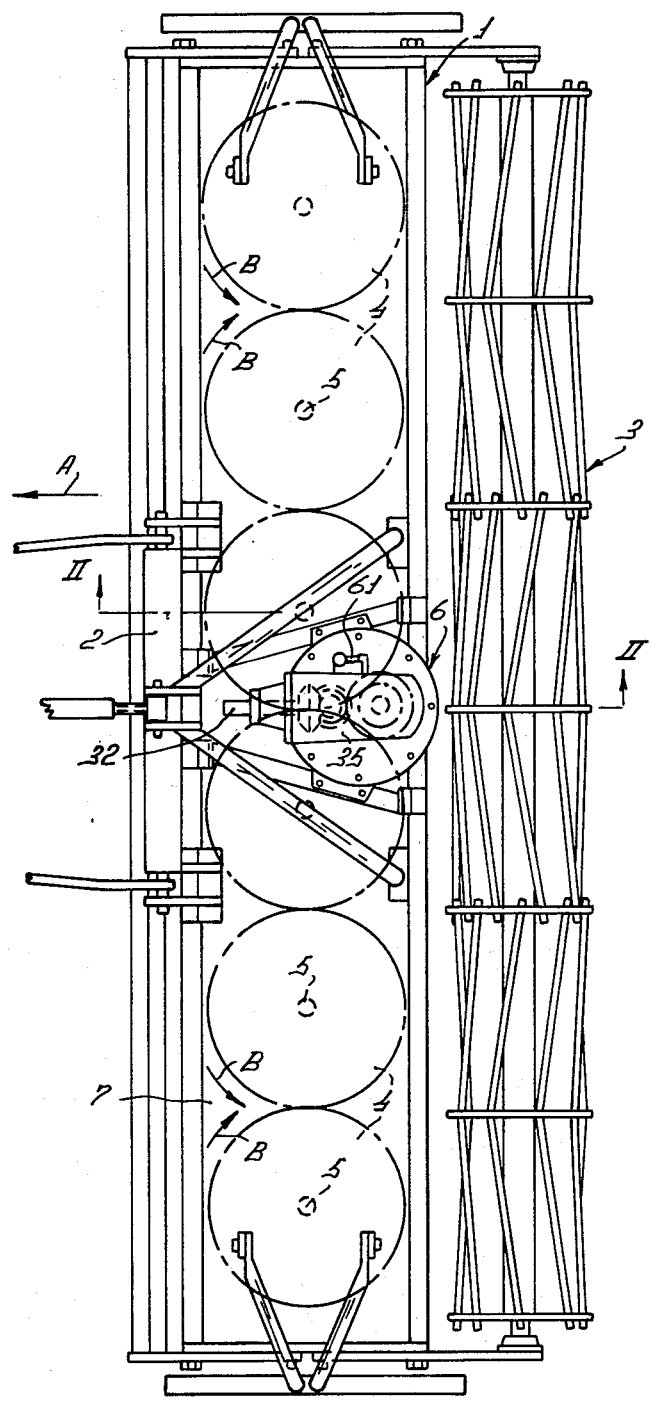
Figure 2:
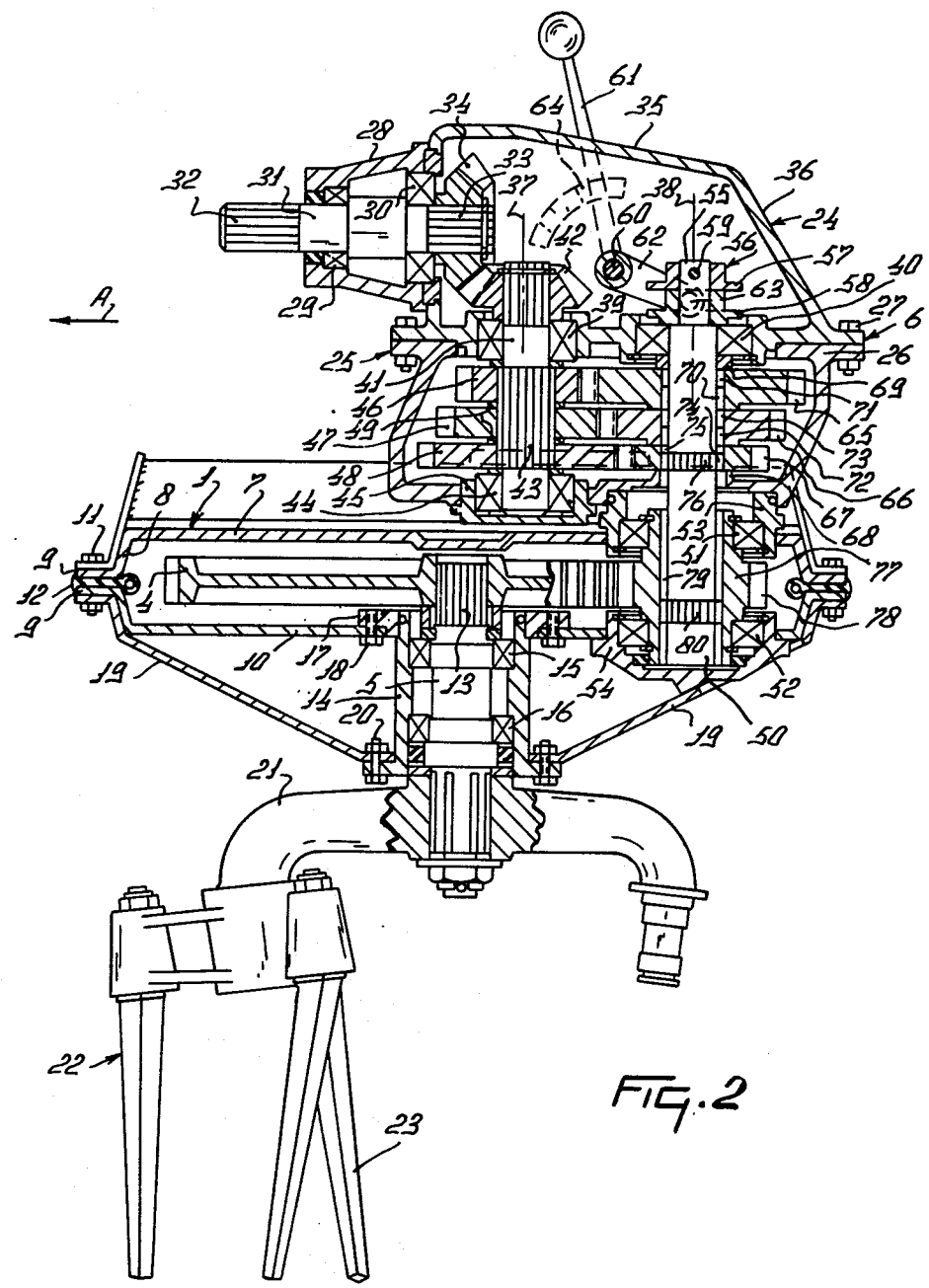
Figure 3:
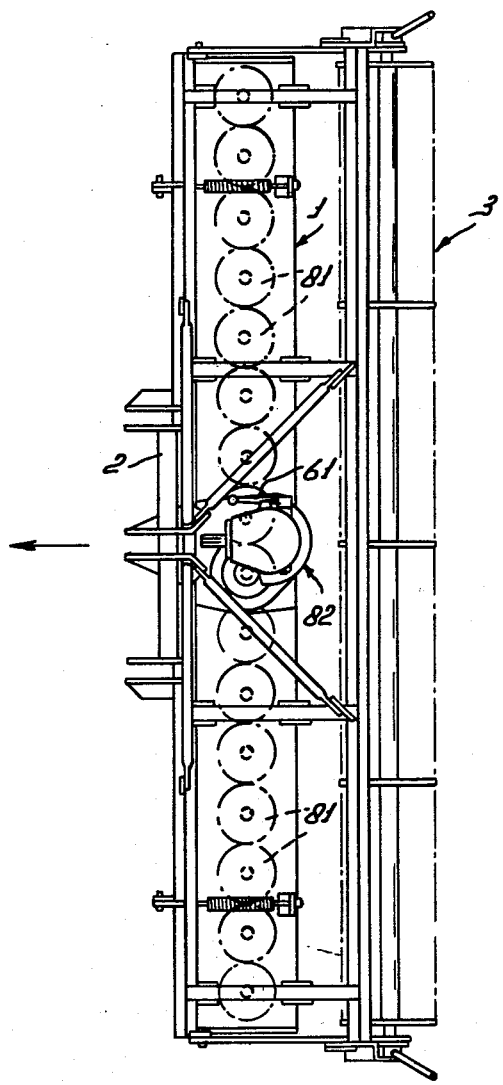
Figure 4:
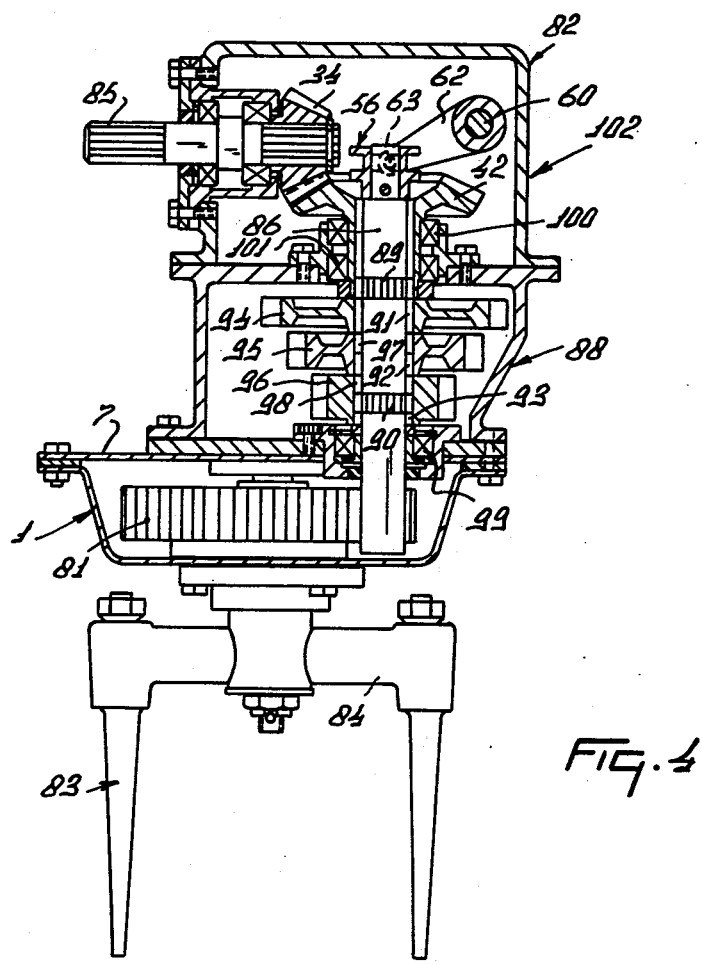
Figure 5:
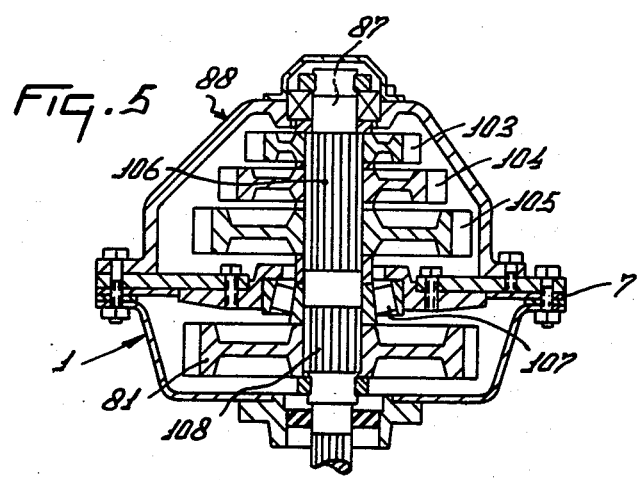

In this way not only the speed of the working member can be readily changed, but also the number of mechanical components involved in setting different operative output speeds is minimized. dr For a better understanding of the invention, and to show how the same may be carried into effect, reference will now be made, by way of example, to the accompanying drawings, in which:

FIG. 1 is a plan view of an agricultural implement in accordance with the invention in the form of a soil cultivating inplement or rotary harrow, FIG. 2 is a section, to an enlarged scale, taken on the line II—II in FIG. 1, FIG. 3 is a plan view of a second implement in accordance with the invention, FIG. 4 is a section taken on the line IV—IV in FIG. 6, FIG. 5 is a section taken on the line V—V in FIG. 6, FIG. 6 is a plan view of a central region of the implement of FIG. 3 to an enlarged scale, and FIG. 7 is a view as seen in the direction of an arrow VII in FIG. 6.

As one of the possibilities of application of the principle of this invention to many agricultural implements, FIG. 1 illustrates a soil cultivating implement in the form of a rotary harrow comprising a supporting hollow frame portion in the form of a gear box 1 that extends transverse, and usually substantially perpendicular, to the intended direction of operative travel A and that is arranged to be coupled with the three-point lifting device or hitch of a tractor or other operating vehicle by means of fastening points on a generally triangular coupling member or trestle 2. A crumbling roller 3 extends throughout the width of the implement behind the gear box 1, by means of which roller 3 the maximum depth of penetration of soil working or cultivating members of the machine into the soil can be governed by upward and downward adjustment of the level of the supporting roller relative to the gear box 1. In this embodiment, the gear box 1 includes three pairs of gear wheels or pinions 4 which can be driven to rotate about parallel, upright rotary axes. The teeth of the successive gear wheels 4, formed in this embodiment as straight-toothed or spur-toothed gear wheels, are in mesh with one another so that the direction of roration B (FIG. 1) of each gear wheel 4 is opposite to that of the or each immediately neighbouring gear wheel 4.

In the direct proximity of a vertical plane of substantial symmetry of the implement that extends parallel to the direction A, there is disposed a gear wheel housing or gear box 6 arranged on the top of the gear box 1 and serving to drive the gear wheels 4 and hence the soil working or cultivating members that are mounted at the lower ends of shafts 5 embodying their axes of rotation at different, selective, speeds whilst the input speed applied to an input shaft 31 of the gear wheel housing 6 remains the same.

As shown in the sectional view of FIG. 2, the gear box 1 has a top plate 7 covering the whole width of the implement, the top plate 7 being provided with downwardly bent-over portions 8 along its front and rear edges, with respect to the direction A, said portions 8 having flanges 9. A bottom plate 10 of the gear box 1 is shaped in a symmetrically identical way and is fastened to the top plate 7 by bolts 11. Between the engaging flanges 9 of the top plate 7 and the bottom plate 10, a gasket strip 12 of flexible material is clamped both along the front edge and along the rear edge of the gear box 1. The row of six gear wheels 4 is located between the top plate 7 and the bottom plate 10 of the gear box 1, each gear wheel 4 comprising a hub having internal splines co-operating with matching external splines 13 on the outer surface of the upper end of each of the shafts 5. The external splines 13 extend axially around only the upper part of the outer circumference of each shaft 5. Only the portion of each shaft 5 having the splines 13 is located inside the gear box 1, whereas a further portion of each shaft 5 having approximately four times the length of the portion provided with the external splines 13 projects from the bottom of the gear box 1. For this purpose the bottom plate 10 is provided at regular intervals with bearing bushings 14 extending in a row that is transverse to the direction A, each bushing 14 having two spaced bearings 15 and 16 whose inner races engage the outer surface of the portion of the shaft 5 concerned, said portion projecting downwardly out of the gear box 1. The bearing bushings 14 are fixed in place at their upper ends by fitting those ends in rings 17 which are secured by bolts 18 to the bottom plate 10. At their lower ends, the bearing bushings 14 are fastened to the gear box 1 by means of a supporting plate 19 that covers the whole width of the implement, said plate 19 being bent into the shape of a shallow flat-based V, as shown in the sectional view of FIG. 2; near its free edges it is secured by the bolts 11 to the flanges 9 of the gear box 1. At its center, the supporting plate 19 has a row of holes through which the bodies of the bearing bushings 14 can be passed upwardly, the lower ends thereof having flanges which are secured by bolts 20 to the edges of the holes in the supporting plate 19.

That portion of each shaft 5 which projects from beneath the supporting plate 19 is also provided with axial splines by which, together with a nut, a support 21 is secured to each shaft 5, said support having arms extending from the shaft 5 in a substantially radial direction but being bent over downwardly at a distance therefrom. Each bent-over end of each support 21 constitutes a rotary bearing for a corresponding cultivating tool 22 of the soil working or cultivating member concerned. In this embodiment, each tool 22 has three tines 23 which are freely rotatable together about the axis of the bent-over end of the associated support 21.

The gear wheel housing or gear box 6 comprises upper and lower portions 24 and 25. The lower portion 25 is directly secured to the top of the gear box 1; it is open at the open top and is there provided with an uninterrupted flange 26 supporting the upper portion 24 to which it is fastened by bolts 27. The upper portion 24 of the gear wheel housing or gear box 6 is closed on top but is partly open at the bottom so that an open internal communication is established between the portions 24 and 25. The portion 24 has, at the front with respect to the direction A, bearing holder 28, in which two spaced bearings 29 and 30 are arranged, the inner races of which bearings support the input shaft 31. The shaft 31 is provided at the front with axial splines 32 projecting from the bearing holder 28 and intended to fit internal splines at one end of an auxiliary telescopic transmission shaft by which the implement can be operated from a tractor or other vehicle. Such transmission shafts are known per se and have universal joints at their opposite ends. At its rear end, the shaft 31 also has axial splines 33 that are located inside the gear wheel housing or gear box 6 and that serve to receive the hub of a bevel gear wheel or pinion 34.

The top of the upper portion 24 of the gear wheel housing 6 is formed by a wall 35 which joins the bearing holder 28 at the front and merges at the rear into a wall portion 36 which is inclined downwardly and rearwardly away from the top wall 35 at an angle of about 60° to the horizontal and which joins at its lower end a flange that directly engages the flange 26 of the lower portion 25 (FIG. 2).

The open bottom of the upper portion 24 has two circular holes, whose respective center lines or axes 37 and 38 are both parallel to the axes of the shafts 5. The edges of the two holes hold bearings 39 and 40 respectively that are located one behind the other in the direction A. The bearing 39 receives a driving shaft 41 whose axis coincides with the axis 37. The driving shaft 41 projects by part of its length above the bearing 39 and is provided along said part with external axial splines by which a bevel gear wheel or pinion 42 is connected to the shaft 41. The center line or axis 37 perpendicularly intersects the center line or axis of the input shaft 31. The bevel gear wheel or pinion 42 is directly in mesh with the bevel gear wheel or pinion 34 on the input shaft 31. The driving shaft 41 projects throughout about 60% of its overal length beneath the bearing 39 and is provided over part of said length with axially extending external splines 43 around the outer surface of said part. Between the splines holding the bevel gear wheel 42 on the shaft 41 and the external splines 43, the shaft 41 has a plain outer surface engaging the inner race of the bearing 39. Beneath the external toothing 43, the shaft 41 has an end portion serving as a stub shaft having a plain outer surface. This stub shaft is supported in a bearing 44 in a bearing holder 45 secured in the bottom wall of the lower portion 24 of the housing or gear box 6.

Three straight-toothed gear wheels 46, 47 and 48 are mounted in superposed relationship on the driving shaft 41 by means of the external splines 43. The central gear wheel 47 has a pitch circle exceeding that of the upper gear wheel 46, whereas the lower gear wheel 48 has a pitch circle exceeding that of the central gear wheel 47. The diameter of the pitch circle of the gear wheel 46 is 60 to 70% of that of the gear wheel 47 and the diameter of the pitch circle of the gear wheel 48 is 150 to 160% of that of the gear wheel 47. The axial thickness of the gear wheel 47, measured in the direction of the axis 37, is about five-sixths of the thickness of the gear wheel 46, whereas the thickness of the gear wheel 48 is about two-thirds of the thickness of the gear wheel 46. The gear wheels 46 to 48 each have at the center a hole bounded by inner axial splines matching the external splines 43 of the shaft 41. Between the gear wheels 46 and 47 and between the gear wheels 47 and 48 spacing rings or washers 49 fit around the splines 43.

The center line of axis 38 that is located behind the center line or axis 37 relative to the direction A, is embodied in a side-shaft 50 which is held at the top on the bearing 40 and otherwise in bearings 51 and 52 surrounding the lower part of the shaft 50. The bearing 51 is arranged in a bearing holder 53 which is secured in the top plate 7 of the gear box 1. The bearing 51 is located, viewed in a direction parallel to the centre line or axis 38, just beneath the bearing 44, since the bearing holder 45 is located just above the top plate 7. The distance between the bearings 51 and 52 is about 15 to 20% of the overall length of the shaft 50. The bearing 52 is arranged in a bearing holder 54 supported from the bottom plate 10 and, moreover, from the rear part of the supporting plate 19. The bearing 52 is located at the level of the bottom plate 10. The overall length of the shaft 50 is about one-sixth of that of the shaft 41, the upper ends of said shafts being located approximately at the same level.

A top portion of the shaft 50, forming a stub shaft 55, is surrounded by an annular setting member 56, a bore of which intimately receives the stub shaft 55, the member 56 having on its outer surface uninterrupted flanges 57 and 58 that are spaced apart from one another in an axial direction. The setting member 56 is secured to the shaft 50 by a transverse pin 59 passing through said member and through the stub shaft 55. On one side of the upper portion 24 of the gear wheel housing or gear box 6, when viewed in the direction A, there is journalled a pivotal shaft 60 to which a lever 61 located outside the gear wheel housing or gear box 6 is rigidly secured and which holds an arm 62 located inside the gear wheel housing 6, said arm having, at one end remote from the pivotal shaft 60, a setting member formed by a cam or roller 63 that is located inside the groove formed between the two annular flanges 57 and 58 of the setting member 56. The lever 61 is arranged to move along an arcuate locking plate 64 which is located outside the housing 6 and whic has a plurality of notches, any chosen one of which notches can receive the lever 61. The lever 61 is resiliently retained in the selected notch. The resilient retaining mechanism is not illustrated but may be provided by fastening the whole locking plate 64 resiliently to the gear wheel housing 6 or by using a resilient construction for the lever 61.

The portion of the side-shaft 50 joining the setting member 56 and the bearing 40 is provided with three straight-toothed gear wheels 65, 66 and 67 arranged so that the gear wheel 65 is constantly in mesh with the gear wheel 46, the gear wheel 66 with the gear wheel 47 and the gear wheel 67 with the gear wheel 48. the diameter of the pitch circle of the gear wheel 67 is equal to that of the gear wheel 46, that of the gear wheel 66 is equal to that of the gear wheel 47 and that of the gear wheel 65 is equal to that of the gear wheel 48. The axial thickness of the gear wheels 46, 65 and 47, 66 and 48, 67, measured in a direction parallel to the center line or axis 38, are substantially equal to one another. At their lower sides, and near the shaft 50, the gear wheels 65 and 66 have annular projections the lower surfaces of which are supported from the subjacent gear wheels 66 and 67 respectively. The gear wheel 67 which does not have such a projection is supported at its bottom face by a cam 68 forming part of the bottom portion of the lower part 25 of the gear wheel housing 6. The assembly of the three gear wheels 65 to 67 is enclosed in the gear wheel housing 6 in the direction of the center line or axis 38 between the cam 68 and a ring 69 located between the inner race of the bearing 40 and the top of the gear wheel 65.

The gear 65 to 67 each have internal splines 70, 72 and 74 respectively arranged around the shaft 50. The splines 70, 72, 74 extend axially parallel to the centre line or axis 38. The splines 70 of the gear wheel 65 cover only part of the thickness of the gear wheel 65 so that a portion 71 of the central bore of the gear wheel 65 is plain and does not have splines. The bore of the gear wheel 65 along the plain portion 71 receives the side-shaft 50 with an ample amount of clearance. In a similar manner the gear wheel 66 has the internal splines 72 over only part of its thickness, whereas a further part of its thickness 73 is plain and does not have splines, the side-shaft 50 being located therein with an ample amount of clearance. The gear wheel 67 also has the internal splines 74 over only part of the height of its bore receiving the side-shaft 50, a further part 75 of said height of the bore in the gear wheel 67 being plain, the shaft 50 being received therein with ample clearance. The internal splines 70, 72 and 74 have identical shapes and the sizes of the bores along the plain parts or portions 71, 73 and 75 outside the shaft are the same and substantially correspond to the axial heights of the internal splines 70, 72 and 74. The plain part 71 of the gear wheel 65 not having splines is located between the ring 69 and the internal splines 70, the part of the height of the gear wheel 66 not having internal splines is located between the internal splines 70 of the gear wheel 65 and the internal splines 72 of the gear wheel 66 itself, whereas the part of the gear wheel 67 not having internal splines is located between the internal splines 72 of the gear wheel 66 and the internal splines 74 of the gear wheel 67 itself. The axial heights of the plain parts 71, 73 and 75 are equal to one another.

The side-shaft 50 has external splines 76 whose teeth extend in an axial direction. The axial height (length) of the splines 76 of the side-shaft 50 is at the most equal to the height of the plain parts 71, 73 and 75 of the gear wheels 65, 66 and 67 respectively, that do not have internal splines. The external splines 76 are provided in an axial direction at such a place on the side-shaft 50 that they mesh with the internal splines 74 of the lowermost gear wheel 67 when the bottom face of the setting member 56 engages the top of the bearing 40.

The lower end of the side-shaft 50 is surrounded by a sleeve 77, which is journalled in the bearings 51 and 52, the outer circumference of the sleeve 77 being provided, between the bearings 51 and 52, with external teeth 78 which are constantly in mesh with the teeth of one of the center pair of gear wheels 4 in the gear box 1. The sleeve 77 has internal splines 79 covering its entire height and being constantly in mesh with external straight splines 80 on the outer circumference of the side-shaft 50. The region of the outer surface of the shaft 50 carrying the splines 80 is spaced from the external splines 76 by a distance which is such that, when the splines 76 are located in the plain part 71 of the gear wheel 65, the splines 80 are still in mesh with the top parts of the internal splines 79 of the sleeve 77. The axial height of the external splines 80 is approximately equal to the axial height of each of the plain parts 71, 73 and 75 of the gear wheels 65 to 67.

During the operation, the implement is driven by the aforementioned auxiliary telescopic transmission shaft powered from the tractor or other vehicle and being operatively connected with the splines 32 of the input shaft 31. The rotation of the shaft 31 is converted by the indentical bevel gear wheels or pinions 34 and 42 into rotation of the driving shaft 41. Since the gear wheels 46, 47 and 48 are mounted on the external splines 43 of the shaft 41, these three gear wheels constantly revolve with the shaft 41 so that the three gear wheels 65, 66 and 67, which are constantly in mesh with the gear wheels 46, 47 and 48 respectively, are also constantly driven. However, in the position of the parts that is shown in FIG. 2, one of the gear wheels (i.e. the gear wheel 67) is coupled with the side-shaft 50 because the external splines 76 of the side-shaft 50 engage the internal splines 74 of the gear wheel 67. The driving torque transferred by the gear wheels 48 and 67 to the side-shaft 50 is transmitted by the external splines 80 of the shaft 50, via the internal splines 79 of the sleeve 77, the external teeth 78 of the sleeve 77 and the teeth of one of the neighbouring gear wheels 4 to all of the other intermeshing gear wheels 4 and thus to the rotary shafts 5 and to the supports 21 of the six soil working or cultivating members. Each of those members is therefore positively rotated whilst its tools will rotate about the centre lines of the bent-over ends of the corresponding supports 21, this latter ground-driven rotation being caused by ground contact of the tines 23. It may be desirable to drive the soil working or cultivating members at different speeds in different kinds of soil. On heavy soil a more intensive crumbling can be achieved by driving the members with a higher speed of rotation whereas, on light soil, a lower driving speed may be advantageous. In this case the lever 61 is moved downwards along the locking plate 64 so that the cam or roller 63 moves upwards, the resulting force exerted on the flange 57 of the setting member 56 moving the shaft 50 upwardly in an axial direction. In this case the external splines 76 are displaced out of the internal splines 74 of the gear wheel 67, the external splines 76 thus becoming engaged with the plain part 75 of the gear wheel 67 where no internal splines are provided. This results in a free run ("neutral" condition), in which the soil working or cultivating members and their tools 22 remain at rest while the input shaft 31 is driven. Upon a further downward movement of the lever 61 along the locking plate 64, the splines 76 will engage the internal splines 72 of the gear wheel 66 which is thus coupled to the shaft 50 for rotation therewith. In this condition, the driving torque is transferred via the driving shaft 41 and the gear wheel 47 to the gear wheel 66 so that, with the same driving speed of the input shaft 31, a different speed of rotation of the shaft 50 is obtained. The gear wheels 65 and 67 are then not connected with the shaft 50 and are driven by the gear wheels 46 and 48 respectively so as to rotate freely around the shaft 50. The contact surface between the splines rotating loosely around the shaft 50 is formed by the innermost boundary surfaces of the internal splines of the gear wheels concerned, which boundary surfaces intimately fit around the locally plain and smooth outer surface of the shaft 50. When the lever 61 is moved still further downwards, the external splines 76 arrive at the plain part 73 of the gear wheel 66 which again results in a free run ("neutral" condition). A further displacement of the shaft 50 in an upward direction brings the external splines 76 into engagement with the internal splines 70 of the gear wheel 65 which then transmits the driving torque to the shaft 50, the gear wheels 66 and 67 rotating idly around the shaft 50. When the shaft 50 is shifted even further upwardly, the external splines 76 arrive at the plain part 71 of the gear wheel 65 so that again a free run ("neutral" condition) results. In the latter position the external splines 80 still mesh with an upper region of the internal splines 79 of the sleeve 77.

The plain parts 71, 73 and 75 prevent the external splines 76 from ever simultaneously engaging the internal splines of two different gear wheels 65, 66 or 66, 67. During the upward displacement of the shaft 50 by the lever 61, the engagement of the splines 76 with one of the internal splines of the gear wheels surrounding the shaft 50 can sometimes be facilitated, when the machine is lifted by the tractor or other operating vehicle, by manually turning one of the soil working or cultivating members and its tools 22 through a few degrees so that the splines will mesh correctly with one another.

When the driving torque is transferred via the gear wheels 46 and 65, the shaft 50 of this embodiment will rotate with a speed amounting to about 0.64-times that of the shaft 41. If the gear wheels 47 and 66 transfer the torque, the rotary speeds of the shafts 41 and 50 are the same, whereas, during transfer of the torque by the gear wheels 48 and 67, the shaft 50 is driven in this embodiment with a rotary speed approximately equal to 1.57-times that of the shaft 41. If, with the rotary speeds of the shafts 31 and 41 remaining the same, the shaft 50 is driven more rapidly, the transferred torque is lower with the same power so that the gear wheels 47 and 66 and the gear wheels 48 and 67 may be axially thinner than are the superjacent gear wheels.

In the construction described, the number of components required for setting different speeds of the working members of the implement is minimized while, in contrast to an array of relatively slidable gear wheels, none of the teeth are exposed to a risk of damage during a gear change, which damage tends to become more serious in the course of operation, since the damaged teeth are moving continuously relative to co-operating initially undamaged teeth.

In the embodiment shown in FIG. 2, the gear wheels 4 are driven by means of an intermediate gear wheel formed by the sleeve 77 with its external teeth 78, since the gear wheels 4 are comparatively large (diameter substantially 50 cms). If the machine has a larger number of smaller diameter gear wheels 81 (FIG. 3), one of those smaller gear wheels 81 may be directly driven by the side-shaft. This is possible by shaping a gear wheel housing or gear box 82 in a form differing from that of the preceding embodiment. The gear wheels 81 each have a diameter of about 25 cms. and drive soil working or cultivating members 83 (FIG. 4) whose tines are rigidly secured to supports 84 in contrast to the preceding embodiment in which the ground driven tools 22 are used. Assuming the center line of an input shaft 85 driven by the tractor or other operating vehicle to be located in the vertical plane of substantial symmetry that extends parallel to the direction A, a line of connection between the axes of a driving shaft 86 and of a side-shaft 87 is at an acute angle to the direction A (FIG. 6) in the embodiment shown in the FIGS. 3 to 7, as viewed in plan. Contrary to the preceding embodiment, the side-shaft 87 is located obliquely in front of the driving shaft 86 with respect to the direction A. A lower portion 88 of the gear wheel housing or gear box 82, similar to the lower portion 25 in the preceding embodiment, is inclined to the front away from a region around the driving shaft 86, considered in the direction A. A lower portion of the side-shaft 87 directly carries the support 84 of one of the row of soil working or cultivating members 83 without using an intermediate gear wheel as in the preceding embodiment.

In the embodiment of FIG. 3 to 7, the driving shaft 86 (FIG. 4) instead of the side-shaft is axially displaceable by means of the arm 62, the cam or roller 63 being in co-operation with the setting member 56 (parts having essentially identical shapes and/or functions to those of the preceding embodiment are designated by the same reference numerals). The driving shaft 86 locally has external, axial splines 89 and 90 which are spaced from one another in an axial direction and are comparable with the splines 76 and 80 of the first embodiment. The lower external splines 90 can come, by axial displacement of the driving shaft 86, into mesh with internal splines 91, 92 or 93 of gear wheels 94, 95 or 96 respectively in analogy with the co-operation of the external splines 76 with the internal splines 70, 72 and 74 of the gear wheels 65, 66 and 67 respectively of the first embodiment. In the construction shown in FIG. 4, the axial displaceability of the shaft applies to the driving shaft 86 instead of the side-shaft 50 of FIG. 2, since the side-shaft 87 directly drives the rotary soil working or cultivating members 83. The gear wheels 95 and 96 do not have internal splines over plain parts 97 and 98 respectively of the heights of their bores. The heights of said parts 97 and 98 correspond with those of the external splines 90 so that, as in the preceding embodiment, a free run of the driving shaft 86 ("neutral" condition) can be achieved while the splines 90 are prevented from simultaneously co-operating with two gear wheels. In this embodiment the gear wheel 94 has its internal splines 91 throughout its height.

In this embodiment, the hub of the bevel gear wheel 42 also has internal axial splines which co-operate with the external splines 89 of the driving shaft 86, the axial length of said hub being determined by the maximum distance over which the splines 90 have to be axially displaceable in order to couple the shaft 86 with one of the gear wheels 94 to 96. For similar reasons the shaft 86 extends, in the position shown in FIG. 4, over a predetermined distance beneath a lowermost bearing 99 in order to ensure that, in its topmost position, in which it is coupled with the gear wheel 94, the shaft 86 is still held in the bearing 99. Near its top, the shaft 86 is journalled via the hub of the gear wheel 42 in two bearings 100 and 101 which are arranged side by side in an axial direction. The gear wheels or pinions 34 and 42 and the setting member 60, 62 are enclosed by an upper portion 102 of the gear wheel housing 82, which housing also supports the input shaft 85 and has a substantially cylindrical outer circumference arranged on one side on the lower portion 88 that is inclined to the direction A (see FIGS. 6 and 7).

The foremost part of said lower portion 88 encloses three gear wheels 103, 104 and 105 connected in superposed relationship to the side-shaft 87 and constantly being in direct mesh with the gear wheels 94, 95 and 96 respectively. The gear wheels 103 to 105 have internal splines fitting external splines 106 on part of the length of the side-shaft 87, said part corresponding to the total height of said three gear wheels 103 to 105. By means of a bearing 107, also capable of withstanding axial load, the shaft 87 is journalled in the top plate of the gear box 1 and again has beneath said bearing external splines 108 by means of which one of the gear wheels 81 is coupled to the side-shaft 87. The side-shaft 87 projects at the bottom of that gear wheel 81 beyond the bottom of the gear box 1 and is there provided with one of the supports 84.

FIGS. 6 and 7 illustrate the disposition of the lower portion 88 of the gear wheel housing or gear box 82 with respect to the direction A, the center line or axis of the input shaft 85 being located in the vertical plane of substantial symmetry of the gear box 1 and implement that extends parallel to the direction A. In the embodiment shown in FIGS. 3 to 7, the gear wheels 94 and 95 are thinner and/or lighter than is the subjacent gear wheel 96 having regard to the torque to be transferred thereby, which also applies to the gear wheels with which the wheels 94, 95 and 96 are constantly in mesh. In this embodiment, it is preferred to construct the straight-toothed gear wheels 94, 95 and 96 with 24, 19 and 14 teeth respectively and the gear wheels 103, 104 and 105 with 17, 22 and 27 teeth respectively so that, with a rotary input speed of 540 rev./min., the side-shaft 87 is driven, at will, with a speed of 157, 253 or 413 rev./min.

It will be obvious that the constructions described may be used not only in soil cultivating implements but also in different kinds of agricultural implements which involve the need for adapting the speed of rotation of a working member to the prevailing conditions and the nature of, say, the crop, purely for example, such implements as rotary mowers, drum tedders, forage harvesters, loading wagons, organic manure and artifical fertilizer distributors.

Although various features of the agricultural implements that have been described and/or that are illustrated in the accompanying drawings will be set forth in the following claims as inventive features, it is emphasised that the invention is not necessarily limited to those features and that it includes within its scope each of the parts of each agricultural implement that has been described, and/or that is illustrated in the accompanying drawings, both individually and in various combinations.

What we claim is:

1. An agricultural implement comprising a frame and at least one tool being rotatably mounted on said frame, driving means connected to rotate said tool, including a change speed gear assembly, said assembly comprising two sets of different sized gears and the gears of one set being mounted on a driving shaft and engaging the gears of a second set, said second set of gears being mounted on a driven shaft, means connected to displace one of the shafts relative to its respective gear set and selectively establish any one of a plurality of different transmission gear ratios in the drive to said tool, at least one displaceable shaft being externally splined and the splines of that shaft extending substantially axially parallel to the longitudinal axis of that shaft and along only a portion of the length thereof, said gears on said displaceable shaft having matching internal spline portions that can be selectively engaged with the external splines of said one shaft, the gears of said second set having different axial thicknesses, those gears of smaller thickness having smaller pitch circles than the gears of greater thickness.

2. An agricultural implement comprising a frame and at least one tool being rotatably mounted on said frame, driving means connected to rotate said tool, including a change speed gear assembly, said assembly comprising two sets of different sized gears and the gears of one set being mounted on a driving shaft and engaging the gears of a second set, said second set of gears being mounted on a driven shaft, means connected to displace one of the shafts relative to its respective gear set and selectively establish either of at least two different transmission gear ratios in the drive to said tool, said one shaft having an external splined portion and the splines of that portion extending substantially axially parallel to the longitudinal axis of that shaft and along only part of the length thereof, each gear on said one shaft having matching internal splines on a portion of the axial thickness thereof that selectively mesh with the external spline portion of said one shaft for each gear ratio, the internal splines of each gear being separated from the internal splines of each neighboring gear of the same set by a space that exceeds the width of said splines portion and said internal splines establishing supporting surfaces for the gears on the outer surface of said one shaft.

3. An implement as claimed in claim 2, wherein the gear wheels of only a single set are each splined to the corresponding shaft and rotatable therewith.

4. An implement as claimed in claim 2, wherein, only one gear wheel of each set is engaged to transmit drive to said tool.

5. An implement as claimed in claim 2, wherein, as seen in side elevation, said one shaft is located to the rear of the driving shaft with respect to the direction of travel.

6. An implement as claimed in claim 2, wherein said gear sets each comprise three gear wheels of different sizes and said tool can be rotated at any chosen one of three different speeds in response to a substantially constant input drive speed.

7. An implement as claimed in claim 2, wherein said gear sets are housed in a change-speed gear box and said box is positioned between a rotary input shaft of the implement and a plurality of rotary tools that are rotatable about corresponding upwardly extending axes.

8. An implement as claimed in claim 2, wherein each gear on said one shaft has an internal splined part and a plain part.

9. An implement as claimed in claim 8, wherein a plain part of said gear is not less in axial length than the externally splined portion of said one shaft.

10. An implement as claimed in claim 9, wherein the gears of both sets are splined internally and axially fixed in place relative to the housing of a gear box of said driving means.

11. An implement as claimed in claim 10, wherein each gear is fixed axially in position relative to bearings mounted in said housing and said shafts are journalled in said bearings, said one shaft being externally splined and axially displaceable vertically with respect to said housing.

12. An implement as claimed in claim 9, wherein said one shaft is slidable with respect to a gear sleeve that has internal splines throughout substantially its entire axial length, said sleeve having external teeth that engage said driving means.

13. An implement as claimed in claim 12, wherein said gears of the one set have different axial thicknesses and those gears of smaller axial thickness have smaller pitch circles than the gears of greater axial thickness.

14. An implement as claimed in claim 13, wherein the gears of greater axial thickness have pitch circles of smaller diameter than the gears of smaller axial thickness.

15. An implement as claimed in claim 9, wherein said one shaft has two spaced apart external spline portions one of which co-operates with the internal splines of a further gear, said further gear being engaged to drive said tool.

16. An implement as claimed in claim 21, wherein said one shaft mounts a setting member that has an annular groove and the displacing means fits into the groove, said one shaft together with the setting member being axially displaceable by a cam in vertical directions.

17. An agricultural implement comprising a frame and a plurality of tools on corresponding shafts having respective pinion gears being rotatably mounted on said frame, driving means connected to rotate said tools including a change speed gear assembly having different transmission ratios, said assembly comprising two sets of different sized gears and the gears of one set being splined on a driving shaft and engaging the gears of a second set, said second set of gears being internally splined on a portion of the axial thickness thereof and being mounted on said driven shaft, the gears of each set being superposed and contained in gear housing means, adjusting means connected to slideably displaced one of the shafts with respect to its corresponding set of gears and establish a corresponding transmission drive ratio to said tools through any one gear of the corresponding set, said displaceable shaft having an external splined portion that engages matching internal splines of only one gear of that corresponding set and said internal splines establishing supporting surfaces for the gears on the external surface of the displaceable shaft, said displaceable shaft having a further splined portion that engages a sleeve gear and said sleeve gear being drivenly connected to at least one of said pinion gears.

18. An implement as claimed in claim 17, wherein a plurality of rotary tools are connected to be positively rotated about corresponding upwardly extending axes, said plurality of tools being tined soil working members located in a row that extends transverse to the direction of travel.

19. An implement as claimed in claim 17, wherein said sleeve means is a sleeve gear having internal splines having axial lengths at least equal to the total axial length of said second set of gears, said further splined portion being slideable along said lengths.

20. An implement as claimed in claim 19, wherein said pinion gears are in mesh with one another and said sleeve has external teeth that engage the teeth of one of said pinion gears.

* * * * *